Patented Nov. 18, 1930

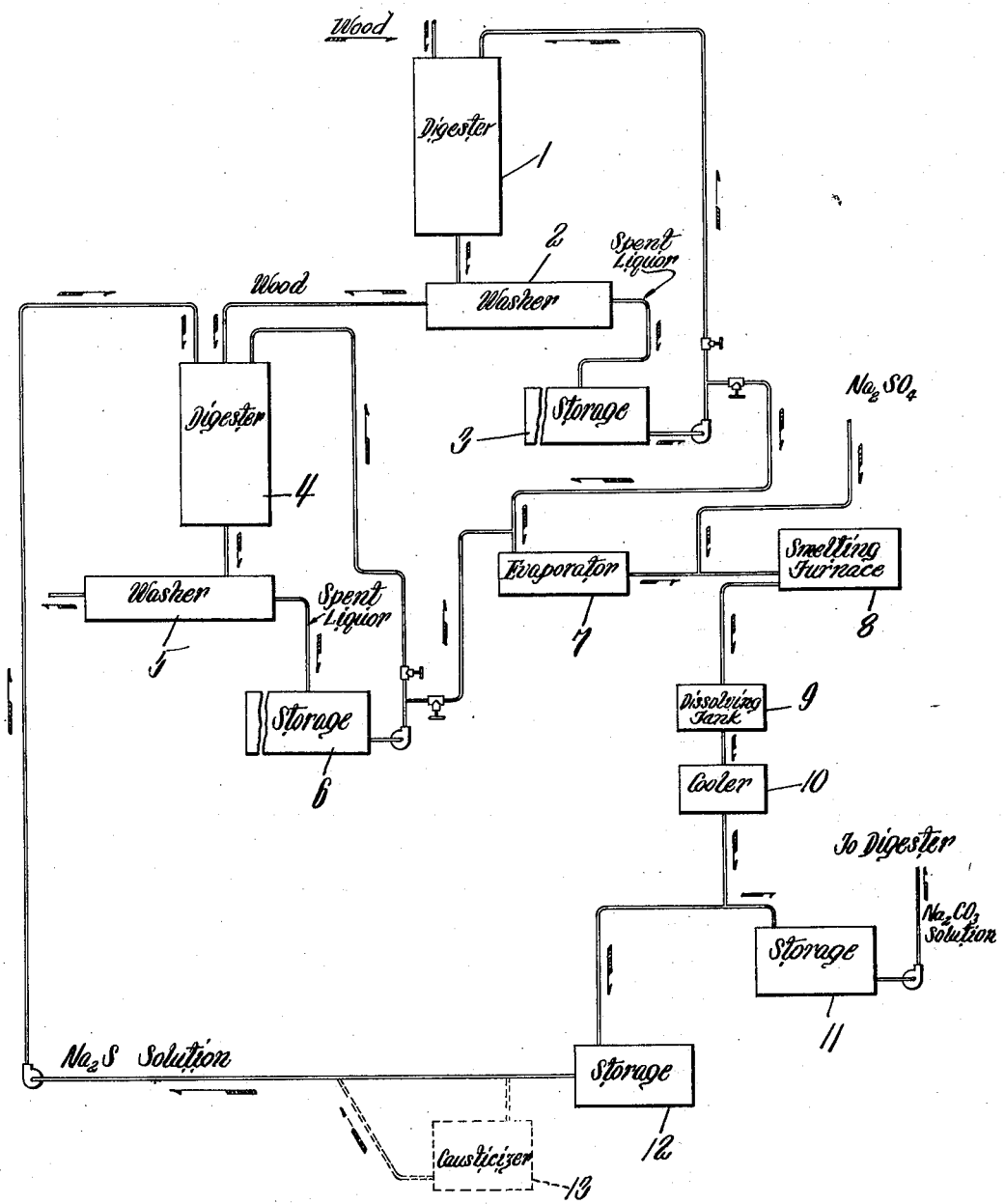

1,781,733

UNITED STATES PATENT OFFICE

GEORGE A. RICHTER, OF BERLIN, NEW HAMPSHIRE, ASSIGNOR TO BROWN COMPANY, OF BERLIN, NEW HAMPSHIRE, A CORPORATION OF MAINE

CYCLIC PROCESS OF FIBER LIBERATION

Application filed March 9, 1929. Serial No. 345,868.

This invention relates to the liberation of fiber from raw cellulosic materials such as wood, being more especially concerned with a cyclic process which results in a product of the general character of kraft pulp and which comprises an economical series of steps.

In the production of kraft pulp, it is usual practice to effect fiber liberation under heat and pressure in a liquor containing caustic soda and sodium sulphide, both these chemicals reacting upon and dissolving the cementitious content of the wood. The spent liquor separated from the resulting fiber is concentrated as in multiple effect evaporators, and then delivered into a suitable retort or furnace, where its organic content is burned and its inorganic content smelted under reducing conditions to produce a smelt comprising sodium sulphide and sodium carbonate, which is delivered into a body of water to produce a smelt solution. The smelt solution is treated with lime to effect causticization of the sodium carbonate and thus to produce a liquor suitable for reuse in the cooking of other raw cellulosic material. The loss of sodium and sulphur constituents in the cycle may be made up as by adding sodium and sulphur, for instance in the form of sodium sulphate or sulphur and caustic soda to the concentrated spent liquor. The sodium carbonate is causticized for the reason that caustic soda is a much better fiber-liberating agent than sodium carbonate, and were sodium carbonate used together with sodium sulphide as a cooking liquor, the sodium sulphide would be consumed by reaction upon the cementitious content of the wood, the less active sodium carbonate effecting little action thereupon.

I have found that if raw cellulosic material such as wood is first cooked in a solution of sodium carbonate and then cooked in a solution of sodium sulphide, not only may fiber liberation be satisfactorily effected, but the resulting product is a high grade pulp of the general character of kraft pulp. When such a process is practised, the spent liquors resulting from sodium carbonate cooking and from sodium sulphide cooking may be mixed and the valuable inorganic chemicals present therein recovered as a smelt comprising sodium sulphide and sodium carbonate, whereupon sodium carbonate may be separated from the smelt as by selective crystallization for use in the first cooking step of a later cook, while the rest of the smelt may be used in the second cooking step of a later cook. If desired, however, the inorganic content of the spent liquor resulting from the first cooking step may be independently smelted in an oxidizing atmosphere to produce a sodium carbonate smelt which may be used for the preparation of fresh sodium carbonate cooking liquor, while the inorganic content of the spent liquor resulting from the second cooking step may be independently smelted in a reducing atmosphere to produce a sodium sulphide smelt which may be used for the preparation of fresh sodium sulphide cooking liquor. Such second-mentioned smelt may, as a result of loss of sulphur constituent by volatilization during smelting, contain some sodium carbonate, which may be removed as by selective crystallization for use in the sodium carbonate liquor, or which may be causticized before the smelt solution is used for cooking. It is thus seen that by practising the two-step cooking process of the present invention, the use of lime may be dispensed with.

The process of the present invention may best be understood from the following more complete description thereof when considered in conjunction with the accompanying drawing, which is a flow sheet depicting the various steps of the process and indicating the flow of the materials.

Referring to the drawing, 1 indicates a digester in which the initial step of cooking in sodium carbonate solution may be carried out. The digester may be charged with raw cellulosic material such as chipped wood, and with sufficient sodium carbonate solution, say of 5% to 10% strength, to maintain the wood submerged therein. The batch of wood and liquor may be cooked under atmospheric or superatmospheric pressure conditions, as by injecting live steam thereinto, until the removal of encrusting materials such as resins and ligneous matter substantially ceases. The time of cooking required to effect the desired reaction upon the wood will depend upon the concentration of the sodium carbonate solution and upon the temperature and pressure conditions of cooking. Using a 5% to 10% solution of sodium carbonate and cooking at about 320° F. and under 90 pounds pressure, about three to four hours is required to reach a condition at which the sodium carbonate solution substantially stops reacting upon the wood. At this time, a substantial proportion of the cementitious content of the wood, including ligneous matter, has been removed, as indicated by the deep brown color of the spent cooking liquor; but fiber liberation has not been effected and the spent cooking liquor still contains a substantial proportion of active sodium carbonate. The cooked mass may be delivered into a washer 2, whereupon the wood may be separated from the spent liquor with or without washing with water. The spent liquor from the washer may be delivered into a tank 3, from which a portion may be withdrawn for use, together with fresh sodium carbonate solution, in cooking fresh wood. The rest of the spent liquor may be withdrawn from the tank 3 and its valuable inorganic content regenerated, as will hereinafter be described. The cooked wood coming from the washer 2 may be fed into a digester 4 of the type customarily used for cooking in alkaline liquors under pressure. The chips may then be covered with a solution of sodium sulphide containing some sodium hydroxide, if desired, the concentration of alkali in solution depending upon the character of pulp desired as a product. Inasmuch as a portion of the cementitious content of the chips has already been removed, a solution of alkali concentration lower than that ordinarily used in alkaline cooking liquors may be used to effect fiber liberation, but, if desired, the solution may be of alkaline strength similar to that of the usual kraft liquor, so as to accelerate fiber liberation. The time of cooking necessary to effect fiber liberation will depend upon the alkalinity of the liquor and the temperature and pressure of cooking, but when using a liquor of the alkalinity of the usual kraft liquor, say containing from 2 to 2.5 pounds $Na_2O$ equivalent per cubic foot, and cooking under the usual temperature and pressure conditions, say 300° to 335° F. and 67 to 110 pounds pressure, fiber liberation may be effected in as short a period of time as three hours. After fiber liberation has been effected, the digester contents may be discharged into a washer 5, wherein the pulp may be washed free from the spent liquor. The liquor may be passed to a storage tank 6, from which a portion may be returned to the digester for the cooking of other wood coming from the washer 2. The excess liquor in the storage tank 6 may be mixed with the excess coming from the tank 3 and delivered to an evaporator 7, wherein a portion of the aqueous content of the mixture may be evaporated, so that the valuable inorganic constituents thereof may be subsequently economically recovered. The concentrated liquor may then be fed into a furnace 8, maintained under a reducing atmosphere, wherein the organic content of the liquor may be burned and its inorganic content smelted to form a mixture of sodium carbonate and sodium sulphide. The hot smelt from the furnace may be dissolved in a body of water maintained in a tank 9, the hot smelt solution thus produced preferably being of a strength sufficient to permit selective crystallization of sodium carbonate therefrom upon cooling. Such selective crystallization may be promoted by passing the hot smelt solution through a cooler 10, to effect a crystallization of a substantial proportion of the sodium carbonate from solution while the more soluble sodium sulphide remains in solution in the mother liquor. The sodium carbonate crystals thus produced and containing some sodium sulphide, may be removed from the mother liquor and delivered into a tank 11, wherein the sodium carbonate may be dissolved to produce a solution of the desired strength for use in the digester 1, along with the recirculated portion of spent sodium carbonate solution. The mother liquor, containing sodium sulphide and a relatively low proportion of sodium carbonate, may be delivered into a tank 12 and diluted with sufficient water to permit reuse in the digester 4, along with the spent liquor recirculated from the tank 6. If desired, however, the sodium carbonate content of the mother liquor may be causticized in a tank 13, indicated in dotted outline, before its reuse, as sodium hydroxide is a more efficient fiber-liberating agent than sodium carbonate. Losses of sodium and sulphur constituent in the cycle may be made up by adding these constituents in the form of sodium sulphate or sodium carbonate and sulphur to the mixture of spent concentrated liquors, before delivering into the furnace 8, or, if desired, by adding caustic soda to the mother liquor containing sodium sulphide, and sulphur to the mixture of spent concentrated liquors.

A two-step fiber-liberating process such as hereinbefore described, makes possible many advantages over the usual alkaline fiber-liberating process, among which are the following:

(1) It provides for the removal of resins and some of the ligneous matter present in the wood, by a relatively cheap alkali, namely, sodium carbonate.

(2) It provides for fiber liberation in an alkaline liquor of much higher sulphidity than the usual kraft liquor, thus resulting in a superior pulp, as sodium sulphide is milder in its action on cellulose fiber than caustic soda.

(3) It makes possible dispensing with the use of lime.

While the process of the present invention has been specifically described as it is applied in the production of wood pulp, other raw cellulosic materials such as straw, bagasse, corn stalks, and the like may be successfully processed as herein described for the production of pulp.

Having thus described the process of the present invention and its practical application in the production of pulp, it should be evident to those skilled in the art that various changes or modifications might be resorted to without departing from the spirit or scope of invention as defined in the appended claims.

I claim:

1. A process which comprises cooking raw cellulosic material in a solution of sodium carbonate to dissolve a portion of its cementitious content, and then cooking in a solution of sodium sulphide to effect fiber liberation.

2. A process which comprises cooking raw cellulosic material in a solution of sodium carbonate to dissolve a portion of its cementitious content, and then cooking in a solution of sodium sulphide to effect fiber liberation.

3. A process which comprises cooking raw cellulosic material in a solution of sodium carbonate to dissolve a portion of its cementitious content, then cooking in a solution of sodium sulphide to effect fiber liberation, mixing spent liquors resulting from such cooking, and smelting and recovering the inorganic content of the mixture.

4. A cyclic process which comprises cooking raw cellulosic material in a solution of sodium carbonate to dissolve a portion of its cementitious content, then cooking in a solution of sodium sulphide to effect fiber liberation, mixing spent liquors resulting from such cooking, smelting the inorganic content of the mixture in a reducing atmosphere to produce sodium carbonate and sodium sulphide, separating the sodium carbonate from the smelt, using such sodium carbonate for a subsequent first-mentioned cooking, and using the rest of the smelt for a subsequent second-mentioned cooking.

5. A cyclic process which comprises cooking raw cellulosic material in a solution of sodium carbonate to dissolve a portion of its cementitious content, then cooking in a solution of sodium sulphide to effect fiber liberation, mixing spent liquors resulting from such cooking, smelting the inorganic content of the mixture in a reducing atmosphere to produce sodium carbonate and sodium sulphide, dissolving in water to produce a smelt solution, selectively crystallizing sodium carbonate from the solution for a subsequent first-mentioned cooking, and using the rest of the smelt for a subsequent second-mentioned cooking.

6. A cyclic process which comprises cooking raw cellulosic material in a solution of sodium carbonate to dissolve a portion of its cementitious content, then cooking in a solution of sodium sulphide to effect fiber liberation, mixing spent liquors resulting from such cooking, smelting the inorganic content of the mixture in a reducing atmosphere to produce sodium carbonate and sodium sulphide, dissolving in water to produce a smelt solution, selectively crystallizing sodium carbonate from the solution for a subsequent first-mentioned cooking, causticizing sodium carbonate remaining in the rest of the smelt solution, and using the rest of such causticized smelt solution for a subsequent second-mentioned cooking.

In testimony whereof I have affixed my signature.

GEORGE A. RICHTER.